US008431037B2

(12) United States Patent
Mamidanna et al.

(10) Patent No.: US 8,431,037 B2
(45) Date of Patent: Apr. 30, 2013

(54) LIQUID COMPOSITE DIELECTRIC MATERIAL

(75) Inventors: Sri Ramachandra Rao Mamidanna, Chennai (IN); Ramachandran Balakrishnan, Chennai (IN)

(73) Assignee: Indian Institute of Technology Madras, Chennai (IN)

( * ) Notice: Subject to any disclaimer, the term of this patent is extended or adjusted under 35 U.S.C. 154(b) by 575 days.

(21) Appl. No.: 12/646,435

(22) Filed: Dec. 23, 2009

(65) Prior Publication Data
US 2011/0085282 A1 Apr. 14, 2011

(30) Foreign Application Priority Data
Oct. 11, 2009 (IN) .......................... 2748/CHE/2009

(51) Int. Cl.
*H01B 3/00* (2006.01)
*H01B 19/00* (2006.01)
(52) U.S. Cl.
USPC ............. 252/62.9 PZ; 252/572; 252/62.9 R; 516/33; 361/327
(58) Field of Classification Search ............. 252/62.9 R, 252/62.9 PZ, 572; 516/33; 361/327
See application file for complete search history.

(56) References Cited

U.S. PATENT DOCUMENTS

| 5,217,638 | A | * | 6/1993 | Hattori et al. ................ 252/74 |
| 5,294,360 | A | * | 3/1994 | Carlson et al. ................ 252/74 |
| 6,322,718 | B1 | | 11/2001 | Dai et al. |
| 8,053,397 | B2 | * | 11/2011 | Huang et al. ................ 507/269 |
| 2003/0013598 | A1 | | 1/2003 | Hagiwara et al. |
| 2004/0014820 | A1 | * | 1/2004 | Belleville et al. ................ 516/33 |
| 2004/0118686 | A1 | * | 6/2004 | Ma et al. ................ 204/487 |
| 2004/0147658 | A1 | | 7/2004 | Matsushima et al. |

FOREIGN PATENT DOCUMENTS

| JP | 2005-041966 A | | 2/2005 |
| JP | 2007-066587 A | | 3/2007 |
| JP | 2007-070446 A | | 3/2007 |
| WO | WO 00/26152 | * | 5/2000 |
| WO | WO 00/26152 A1 | | 5/2000 |

OTHER PUBLICATIONS

International Search Report and Written Opinion dated Feb. 16, 2011, received in PCT/IB2010/002787.
Masingboon, et al., "Giant Dielectric Response in Perovskite-Derivative $CaCu_3Ti_4O_{12}$ Prepared by Polymerized Complex Method," *Advances in Science and Technology*, vol. 45 (2006) pp. 2345-2350.
Masingboon, et al., "Synthesis and giant dielectric behavior of CaCu3Ti4O12 ceramics prepared by polymerized complex method," *Materials Chemistry and Physics* 109 (2008) pp. 262-270.
Cell Balancing, Electropedia, Battery and Energy Technologies, pp. 1-2, obtained from url: <http://www.mpoweruk.com/balancing.htm>.

(Continued)

*Primary Examiner* — Carol M Koslow
(74) *Attorney, Agent, or Firm* — Knobbe, Martens, Olson & Bear, LLP

(57) ABSTRACT

An embodiment relates to a liquid composite dielectric material (LCDM) comprising a metal-containing dispersed phase material in an organic liquid phase material, wherein the liquid composite dielectric material has a dielectric permittivity ($\epsilon_r$) of 10000 or more at 40 Hz and a dielectric loss (tan δ) of 1 or less at 40 Hz.

20 Claims, 3 Drawing Sheets

(a)

(b)

OTHER PUBLICATIONS

Conway, Transition from "Supercapacitor" to "Battery" Behavior in Electrochemical Energy Storage, Journal of Electrochemical Society, Jun. 1991, vol. 138, No. 6, pp. 1539-1548.

Conway et al., The Role and Utilization of Pseudocapacitance for Energy Storage by Supercapacitors, Journal of Power Sources, May-Jun. 1997, vol. 66, pp. 1-14.

Tanahashi et al., Electrochemical Characterization of Activated Carbon-Fiber Cloth Polarizable Electrodes for Electric Double-Layer Capacitors, Journal of Electrochemical Society, Oct. 1990, vol. 137, No. 10, pp. 3052-3057.

Srinivasan et al., Studies on the Capacitance of Nickel Oxide Films: Effect of Heating Temperature and Electrolyte Concentration, Journal of the Electrochemical Society, 2000, vol. 147, No. 3, pp. 880-885.

Seveyrat et al., Temperature Dependence of Macroscopic and Microscopic PZT Properties Studied by Thermo-Mechanical Analysis, Dielectric Measurements and X-Ray Diffraction, Ceramics International, Sep. 25, 2007, vol. 35, pp. 45-49.

Masingboon et al., Giant Dielectric Response in Perovskite-Derivative $CaCu_3Ti_4O_{12}$ Prepared by Polymerized Complex Method, Advances in Science and Technology, 2006, vol. 45, pp. 2345-2350.

Masingboon et al., Synthesis and Giant Dielectric Behavior of $CaCu_3Ti_4O_{12}$ Ceramics Prepared by Polymerized Complex Method, Materials Chemistry and Physics, 2008, vol. 109, pp. 262-270.

Sleight, Compounds That Contract on Heating, ACS Award Address for Chemistry of Materials, Inorganic Chemistry, May 28, 1998, vol. 37, pp. 2854-2860.

Guo et al., Origin of the High Piezoelectric Response in $PbZr_{1-x}Ti_xO_3$, Physical Review Letters, Jun. 5, 2000, vol. 84, No. 23, pp. 5423-5426.

\* cited by examiner

LIQUID COMPOSITE DIELECTRIC MATERIAL

CROSS-REFERENCE TO RELATED APPLICATIONS

The present application claims the benefit of Indian Patent Application No. 2748/CHE/2009, filed Oct. 11, 2009, which is hereby incorporated by reference in its entirety.

BACKGROUND

The current research and development efforts on electrochemical power sources are generally focused on fuel cells, batteries and electrochemical capacitors and are directed towards achieving high energy density, high power density, long cycle life at relatively low cost.

Yet, there is a need for a new class of systems that prevent electrochemical reactions that damage electrodes in normal cells and avoid a cell balancing requirement in a multicell battery while still providing low manufacturing cost. There is also a need for reliable electrical energy storage systems.

SUMMARY

The embodiments herein relate to a liquid composite dielectric material (LCDM) comprising a metal-containing dispersed phase material in an organic liquid phase material, wherein the liquid composite dielectric material has a dielectric permittivity ($\in_r$) of 10000 or more at 40 Hz and a dielectric loss (tan δ) of 1 or less at 40 Hz. For example, the metal-containing dispersed phase material comprises a morphotropic phase boundary (MPB) compound. For example, the organic liquid phase material comprises a glycol. For example, the LCDM has a current leakage density of less than $1 \times 10^{-3}$ Acm$^{-2}$. For example, the LCDM is a homogenous solution. For example, the MPB compound comprises Pb, Zr and Ti. For example, the MPB compound comprises ferroelectric lead zirconate titanate ceramic. For example, the MPB compound comprises Pb, Mg, Nb, and Ti. For example, the MPB compound comprises PbZr$_x$Ti$_{1-x}$O$_3$, wherein $0.4 < x < 0.6$.

Another embodiment relates to an electrochemical capacitor comprising the LCDM described above. For example, the electrochemical capacitor has an operating voltage of 1-100 V and an operating frequency range of 40 Hz-10 MHz. For example, the electrochemical capacitor has a maximum energy density and a power density of a single electrochemical capacitor greater than 100 Whcc$^{-1}$ and $1 \times 10^5$ Wcc$^{-1}$, respectively. For example, the maximum energy density and the power density are about 170 Whcc$^{-1}$ and about $2 \times 10^5$ Wcc$^{-1}$, respectively.

Another embodiment relates to a method of manufacturing a composite dielectric material (LCDM) comprising a metal-containing dispersed phase material in an organic liquid phase material, comprising forming a powder of the metal-containing dispersed phase material by a sol gel route and dispersing the powder of the metal-containing dispersed phase material in the organic liquid phase material to form the LCDC having a homogenous solution. For example, the metal-containing dispersed phase material comprises a morphotropic phase boundary (MPB) compound. For example, the organic liquid phase material comprises a glycol. For example, the MPB compound comprises ferroelectric lead zirconate titanate ceramic.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The term "dielectrics" or "dielectric materials" refer to the broad expanse of nonmetals considered from the standpoint of their interaction with electric, magnetic, or electromagnetic fields such that the materials are capable of storing electric energy. Thus, dielectric materials are gases as well as with liquids and solids. A dielectric material is a substance that is a poor conductor of electricity, but an efficient supporter of electrostatic fields. If the flow of current between opposite electric charge poles is kept to a minimum while the electrostatic lines of flux are not impeded or interrupted, an electrostatic field can store energy. This property is useful in capacitors, especially at radio frequencies. Dielectric materials are also used in the construction of radio-frequency transmission lines.

A property of a dielectric is its ability to support an electrostatic field while dissipating minimal energy in the form of heat. The lower the dielectric loss (the proportion of energy lost as heat), the more effective is a dielectric material. Another consideration is the dielectric constant, the extent to which a substance concentrates the electrostatic lines of flux. Substances with a low dielectric constant include a perfect vacuum, dry air, and most pure, dry gases such as helium and nitrogen. Materials with moderate dielectric constants include ceramics, distilled water, paper, mica, polyethylene, and glass. Metal oxides, in general, have high dielectric constants.

An asset of high-dielectric-constant substances, such as aluminum oxide, is the fact that they make possible the manufacture of high-value capacitors with small physical volume. But these materials are generally not able to withstand electrostatic fields as intense as low-dielectric-constant substances such as air. If the voltage across a dielectric material becomes too great—that is, if the electrostatic field becomes too intense—the material will suddenly begin to conduct current. This phenomenon is called dielectric breakdown. In components that use gases or liquids as the dielectric medium, this condition reverses itself if the voltage decreases below the critical point. But in components containing solid dielectrics, dielectric breakdown usually results in permanent damage.

A "capacitor" or "condenser" is a passive electronic component consisting of a pair of conductors separated by a dielectric. When a voltage potential difference exists between the conductors, an electric field is present in the dielectric. This field stores energy and produces a mechanical force between the plates. The effect is greatest between wide, flat, parallel, narrowly separated conductors. An ideal capacitor is characterized by a single constant value, capacitance, which is measured in farads. This is the ratio of the electric charge on each conductor to the potential difference between them. In practice, the dielectric between the plates passes a small amount of leakage current. The conductors and leads introduce an equivalent series resistance and the dielectric has an electric field strength limit resulting in a breakdown voltage.

The term "permittivity" refers to a physical quantity that describes how an electric field affects, and is affected by, a medium, and is determined by the ability of a material to polarize in response to the field, and thereby reduce the total electric field inside the material. Thus, permittivity relates to a material's ability to transmit (or "permit") an electric field. The constant $\in_0$ is known as the electric constant or the permittivity of free space, and has the value $\in_0 \approx 8.854,187, 817 \times 10^{-12}$ F/m. The "dielectric permittivity" or "relative dielectric permittivity" ($\in_r$) refers to the permittivity of a dielectric material relative, i.e., the static absolute permittivity, to that of free space. The term "dielectric constant" ($\in_r$) refers to "dielectric permittivity" or "relative dielectric permittivity" ($\in_r$); dielectric constant may be either the static or the frequency-dependent relative dielectric permittivity depending on context. Dielectric permittivity ($\in_r$) ranges are: <2000 (low), 2000<5000 (medium) and >10000 (very high).

The term "dielectric loss" the loss of power in a dielectric caused by the loss of energy in the form of heat generated by an electric field. The dielectric loss is also referred as tan delta, dissipation factor or loss tangent. When alternating current (AC) passes through a capacitor, the current leads the voltage by 90 degrees. When a dielectric is introduced between the capacitor, the molecules of the dielectric fail to align instantaneously with the alternating electric field. These molecules do not align in phase with the changing field. The angle at which the current leads the voltage is reduced from the 90 degree lead by an angle Ø. The value 90-Ø is known as the loss angle and is given by symbol δ. The power factor is defined as cos Ø and the dissipation factor as tan δ. Polar molecules generally exhibit high dielectric power losses at certain frequencies. At low frequencies, dipoles are able to keep in phase with changes in electric field and power losses are low. As the frequency is increased, a point is reached when dipole orientation cannot be completed in time available and the dipole becomes out of phase, resulting in internal friction and generation of heat. Dielectric loss is a measure of the energy absorbed by a dielectric from the alternating electric field per cycle. When the frequency of the alternating electric field is increased further, there may no time for substantial dipole movement; so dielectric loss can be reduced. Dielectric loss depends on temperature.

The term "impedance" or "electrical impedance" describes a measure of opposition to an electric current. Electrical impedance extends the concept of resistance to AC circuits, describing not only the relative amplitudes of the voltage and current, but also the relative phases. When the circuit is driven with direct current (DC) there is no distinction between impedance and resistance; the latter can be thought of as impedance with zero phase angle. Impedance is defined as the frequency domain ratio of the voltage to the current in an AC circuit. In other words, it is voltage—current ratio for a single complex exponential at a particular frequency w. In general, impedance will be a complex number, but this complex number has the same units as resistance, for which the SI unit is the ohm. For a sinusoidal current or voltage input, the polar form of the complex impedance relates the amplitude and phase of the voltage and current. In particular, the magnitude of the complex impedance is ratio of the voltage amplitude to the current amplitude and the phase of the complex impedance is the phase shift by which the current is ahead of the voltage. The reciprocal of impedance is admittance (i.e., admittance is the current-to-voltage ratio, and it conventionally carries mho or Siemens units).

The term "leakage current density" (J) in a dielectric material is defined as the tunneling of mobile charge (i.e., electrons) through an insulating dielectric material per unit area. High leakage current means $J > 1 \times 10^{-3}$ Acm$^{-2}$; medium leakage current means J is of the order of $1 \times 10^{-3}$ Acm$^{-2}$; and low leakage current means $J < 1 \times 10^{-3}$ Acm$^{-2}$.

The term "breakdown field" is the electric field at which rapid reduction in the electrical resistance of the dielectric material occurs.

The term "maximum energy density" of a system is the maximum energy that can be stored in a capacitor per unit of mass, volume or area.

The term "maximum power density" of a system is the maximum power that can be stored in a capacitor per unit of mass, volume or area.

Energy is a scalar physical quantity that describes the amount of work that can be performed by a force, an attribute of objects and systems that is subject to a conservation law; power is the rate at which work is performed or energy is converted; it is energy per unit of time. Ultracapacitor or supercapacitors have high maximum energy density or high maximum packing density.

The term "piezoelectric coefficient," "piezoelectric modulus," or "d33," quantifies the volume change when a piezoelectric material is subject to an electric field. Piezoelectricity is the ability of piezoelectric materials (notably crystals and certain ceramics, including bone) to generate an electric field or electric potential in response to applied mechanical stress. The effect is closely related to a change of polarization density within the material's volume. If the material is not short-circuited, the applied stress induces a voltage across the material.

The term "cell balancing" is a phenomenon of correcting unbalanced cells connected in series. In an example embodiment, the internal impedance (or voltage) differences between cells should be approximately 15% in a cell balanced battery during charging or discharge process when multicells in battery are connected in the series otherwise cells in the battery are unbalanced. The unbalanced cells can be corrected either instantaneously or gradually bypassing cells with higher voltages. This phenomenon is known as cell balancing.

Cell balancing is considered when multiple cells in a battery pack are connected in a series. Cell balancing is not needed in a parallel connection of cells, since this configuration is self-balancing. Battery pack cells are balanced when all the cells in the battery pack have the same matched voltage per cell while in a fully charged or discharged state. If one or more of the cells in a pack are not matched then the battery pack is not balanced. When the cells in the battery pack are not balanced the battery pack has less available capacity, since the capacity of the weakest cell in the series string determines the overall pack capacity. In an unbalanced battery pack, during charge time, one or more cells will reach the maximum charge level before the rest of the cells in the series string. During discharge, the cells that are not fully charged will be depleted before the other cells in the string.

The term "liquid composite" refers to a material containing two phases—a dispersed solid phase in a continuous liquid phase.

The term "homogenous solution" or "homogenous mixture" refers to a mixture that has definite and consistent chemical composition and physical properties in a representative volume element of the mixture. Particles, if any in the mixture, are uniformly spread. A representative volume element (RVE) is a volume element of a mixture that provides a statistical representation of typical material properties of the mixture. It should be of a volume sufficient to contain enough information on the microstructure yet be sufficiently smaller than the macroscopic structural dimensions of the mixture.

The term "metal complex" refers to a structure consisting of a central atom or ion (usually metallic), bonded to a surrounding array of molecules or anions (ligands, complexing agents). When the surrounding array of molecules comprises at least organic molecules, the metal complex is a "metal organic complex."

The term "PZT" refers to a compound comprising at least Pb, Zr and Ti.

The term "morphotropic phase boundary" (MPB) refers to the separation between tetragonal and rhombohedral phase regimes in a solid material, e.g., PZT.

The term "sol gel route" refers to methods of making a material starting from a chemical solution which acts as the precursor for an integrated network (or gel) of either discrete particles or network polymers.

The embodiments relate to a liquid composite dielectric material (LCDM) comprising a metal-containing dispersed phase material in an organic liquid phase material, wherein the liquid composite dielectric material has a high dielectric permittivity ($\in_r$) at 40 Hz and a low dielectric loss (tan δ) at 40 Hz. In one embodiment, the metal-containing dispersed phase material is a morphotropic phase boundary (MPB) compound, for example, a compound comprising Pb, Zr and Ti. In some embodiments, the liquid composite dielectric material comprises an amount of metal-containing material in the range of about 1% to about 5%. In some embodiments, the metal-containing material is a powder form, such as a powder form with an average particle size of about 45 nm to about 200 nm.

One embodiment relates to a LCDM having a stable, low impedance, high dielectric permittivity and low dielectric loss heterogeneous. Low impedance in the context of a multicell capacitor means that there is less than 15% difference between the internal impedance of the individual cells of the multicell capacitor. High dielectric permittivity ($\in_r$) means $\in_r$ of at least 10000 at 40 Hz; and low dielectric loss (tan δ) refers to tan δ of less than 1.

In one embodiment, the LCDM comprises $PbZr_{0.52}Ti_{0.48}O_3$/diethylene glycol (PZT/DEG). Other compounds besides PZT or DEG that can be used in the LCDM comprises a MPB compound such as $0.65Pb(Mg_{1/3}Nb_{2/3})O_3$-$0.35PbTiO_3$, which has superior dielectric, piezoelectric and ferroelectric properties than PZT, and polyethylene glycol (PEG) or other complex polymer instead DEG.

The LCDM was prepared by dispersing, for example, 2 wt % of PZT powders (approximately 45 nm in size) in DEG, and stirring with heating for about 2 h at a bath temperature of 50° C. to obtain homogenous solution. The LCDM thus obtained had a very high dielectric permittivity (≈13593) and low dielectric loss (≈0.9) at room temperature measured at 40 Hz. The leakage current density of the LCDM was low (2.9× $10^{-4}$ $Acm^{-2}$ at an applied voltage of 100 V) and a breakdown field of 1.7 $kVcm^{-1}$. The maximum energy density and maximum power density of the LCDM were 170 $Whcc^{-1}$ and $2\times10^5$ $Wcc^{-1}$ respectively.

Other embodiments relate to MPB comprising ferroelectric lead zirconate titanate ceramics, such as $PbZr_xTi_{1-x}O_3$ (PZT), which can be used in the sensing, actuating and energy storage applications. Generally, the composition range includes x=0.40-0.60, x=0.45-0.57, or x=0.48-0.54, which corresponds to a morphotropic phase boundary (MPB) separating the tetragonal phase from that of rhombohedral. At x~0.48, i.e., the MPB region, the PZT material yields excellent properties having high dielectric and piezoelectric properties. In this example, optimal piezoelectric and dielectric properties were obtained for compositions in the vicinity of the MPB region.

The sample PZT material advantages over currently available ultracapacitor material are:

Ease of synthesis: PZT powders can be easily synthesised by sol gel method with different particle sizes (40-200 nm) by just varying the calcination temperature. Dielectric permittivity of the PZT/DEG composite can be easily tuned by different particle size and different wt % of the PZT in the composite. Morphotropic phase boundary compound $PbZr_{0.52}Ti_{0.48}O_3$ (PZT) was easily synthesized in powder form by sol-gel route starting from lead nitrate ($Pb(NO_3)_2$), zirconium oxychloride ($ZrOCl_2 8H_2O$) and titanium (IV) isopropoxide ($TiC_{12}H_{28}O_4$). These raw materials are dissolved in 100 ml de-ionized water. 5 ml $HNO_3$ was subsequently added to the above solution with stirring. The solution was then refluxed for about 2 h after stirring the solution for 30 min. The obtained precursor was calcined at 600° C. for 3 h and the powder was ground. The PZT powder can be heated at slightly higher temperatures (750-900° C.) for different durations 1-6 h to obtain the PZT powders with different particle sizes.

Low cost: The amount of PZT required in the LCDM of PZT/DEG is small, 1 to 5 wt % of the LCDC. So, the LCDM of PZT/DEG can be easily made at a relatively low cost.

Ease of varying the dielectric permittivity: The PZT powder with different particle sizes can lead to changes in the dielectric permittivity. Dielectric permittivity of the PZT/DEG containing LCDM can be easily tuned by using different particle sizes and different wt % of PZT in the composite. Particle size range of PZT powders: 45-200 nm; wt % percent of PZT powder in DEG: 1-5 Wt %.

Figure 2:
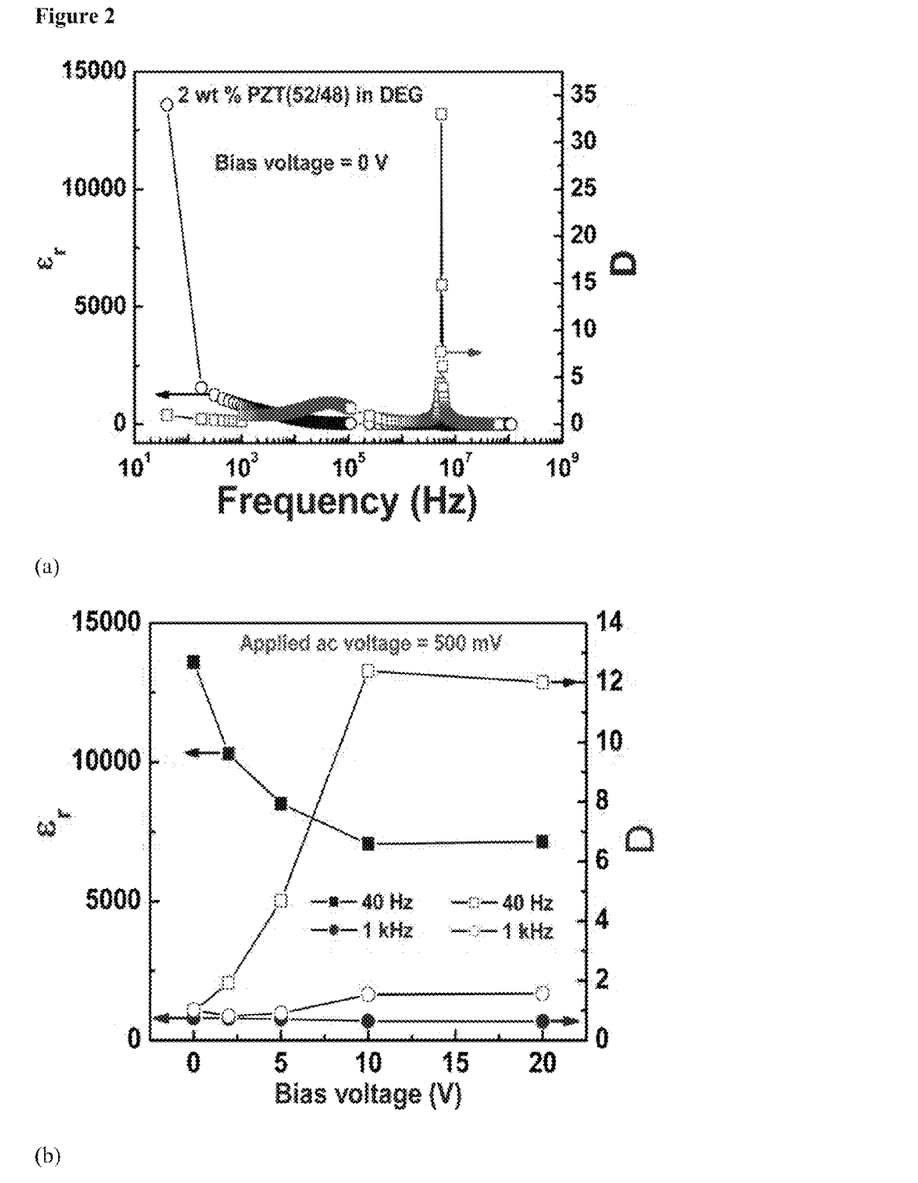
FIG. 2 shows the dielectric permittivity and dielectric loss of a sample PZT/DEG liquid composite dielectric material: (a) frequency dependence and (b) bias voltage dependence.

Since the PZT/DEG containing LCDM is non-corrosive and almost behaves as inert, any electrode material can be used. For example, Cu electrodes have been used for tests results of FIG. 2. Also, Ag and carbon-graphite based electrodes can be used with the PZT/DEG containing LCDM.

The energy storage devices using the LCDM of the embodiments herein have the following advantages:

High energy density without using any hybrid system.

In multicell systems, the cell balancing is not required to avoid failure and damage of the cells, in addition to having high reliability.

Usability in solid state supercapacitors in the form of a liquid electrolyte in gel form, coated over thin film supercapacitor material without the disadvantages of corrosion, self-discharge, and low energy density.

Operating limits: The energy storage devices can be operated at high voltage (100V) and a wide frequency range (40 Hz-10 MHz). The PZT/DEG containing LCDM has low dielectric loss, low leakage current density and high breakdown fields which make this mixture useful in high operating voltage (1-100 V) and wide frequency range (40 Hz-10 MHz).

Since the ultracapacitor material of the embodiments herein is in a liquid phase, the energy storage device can be of any form, size or shape.

EXAMPLES

Figure 1:
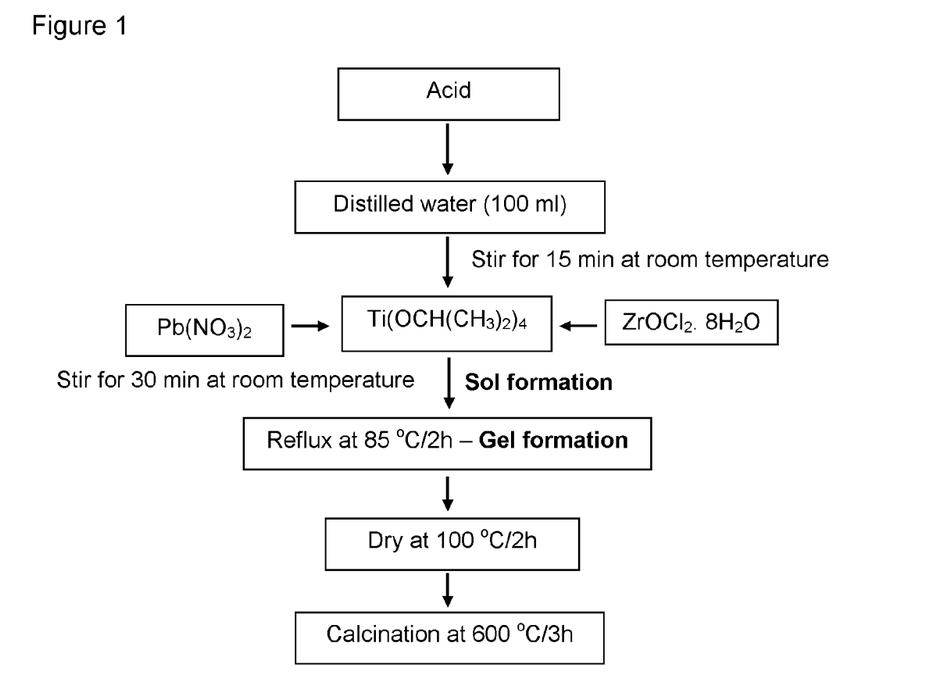
FIG. 1 shows a flow chart for preparation of sample PZT powders by the sol-gel route.

Morphotropic phase boundary compound $PbZr_{0.52}Ti_{0.48}O_3$ (PZT) was synthesized in powder form by sol-gel route starting from lead nitrate ($Pb(NO_3)_2$), zirconium oxychloride ($ZrOCl_2 \cdot 8H_2O$) and titanium (IV) isopropoxide ($TiC_{12}H_{28}O_4$). These raw materials were dissolved in a mixture of 100 ml de-ionized water and citric acid. 5 ml $HNO_3$ was subsequently added to the mixture of PZT and DEG with stirring. The solution was then refluxed for about 2 h after stirring the solution for 30 min. The obtained metal-organic complex (in gel form) at the end of the reaction was calcined at 600° C. for 3 h and the powder was ground. The powder was again heated at slightly higher temperature; 750° C. for 3 h. The flow chart for the preparation of the PZT powders is shown in FIG. 1.

The 2 wt % of PZT powders were dispersed in diethylene glycol (DEG) by magnetically stirring while heating and also subjecting the solution to ultrasonic vibration. The minimum weight percent of PZT can be 1 wt % and the maximum weight percent of PZT can be 5 wt %. The particle sizes of PZT powder were 45±5 nm.

The final homogenous solution of the LCDM was transferred to a liquid capacitor sample holder for testing the dielectric permittivity and leakage current properties of the LCDM.

The dielectric property of the LCDM was studied by an Impedance Analyzer (Agilent 4294A, USA). The capacitance (C) and dielectric loss (D) of empty liquid sample holder and the PZT/DEG solution filled sample holder were measured. Then using the equation $\in_r = C_p/C_o$, the dielectric constant ($\in_r$) of PZT/DEG solution was calculated. Here, $C_p$ and $C_o$ are the capacitance of PZT/DEG solution filled sample holder and empty sample holder, respectively. Very high dielectric permittivity ($\in_r$=13593 at 40 Hz with bias voltage=0 V for the LCDM was measured. The dielectric permittivity gradually decreased to a value of 7114 with an increase in bias voltage upto 20 V. However the dielectric loss (D) is found to increase with increase in bias voltage as shown in FIGS. 2a and 2b. The resistance of the PZT/DEG mixture decreases with increase in bias voltage which basically leads to decrease in dielectric permittivity and increase in dielectric loss.

The frequency resonance at 5.5 MHz is seen clearly in the dielectric loss curve, which can be attributed to ion hoping (or interaction) between PZT and DEG sites. The PZT/DEG solution can be used over wide frequency ranges. The dielectric permittivity of the PZT/DEG composite can be easily tuned by just varying the wt % of PZT content in the composite. This feature can be used to modify the dielectric properties of PZT/DEG solutions, making these solutions useful over wide frequency and operating voltage ranges.

High dielectric permittivity of the composite may be the result of the formation of non-conducting layer (PZT particles as core) covered by conducting layer (DEG molecules) connected in parallel to each other. This feature leads to the unexpected results of increasing the dielectric constant ($\in_r$) from about 2000 of PZT alone to about 14000 (in particular, 13593 in one example) of the LCDM of PZT/DEG.

The leakage current density (J) of the LCDM with applied electric field (E) was measured using a precision premier ferroelectric loop tracer (Radiant Technologies, USA). I-V characteristics of PZT/DEG solution (i.e., an example LCDM) was measured using a precision premier ferroelectric loop tracer (Radiant Technologies, USA). J-E characteristics of PET/DEG were derived using area of the electrode (A) and separation of electrodes (d).

Figure 3:
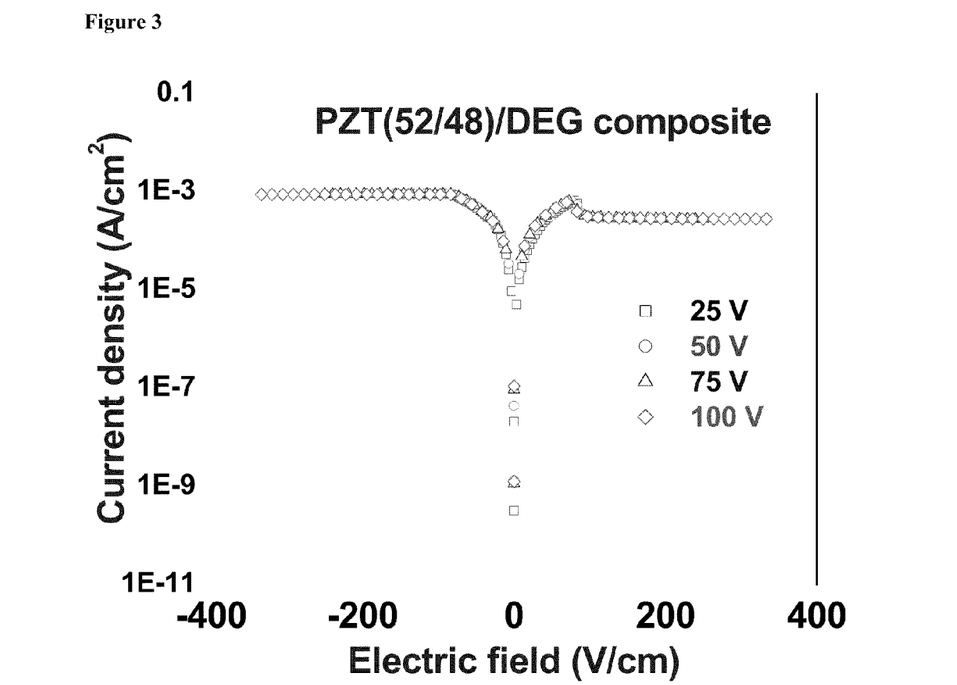
FIG. 3 shows J-E characteristics of a sample PZT/DEG liquid composite dielectric material.

The J-E measurement of the LCDM showed J-E characteristics as those seen in FIG. 3. The example LCDM had a low leakage current density of $2.9 \times 10^{-4}$ $Acm^{-2}$ at an applied voltage of 100 V and breakdown field of 1.7 $kVcm^{-1}$. The maximum energy density and maximum power density of the PZT/DEG containing LCDM were found to be 170 $Whcc^{-1}$ and $2 \times 10^5$ $Wcc^{-1}$ respectively.

Comparative Results

TABLE 1

The energy density and power density of the liquid supercapacitor of the embodiments disclosed herein and of existing electrical storage systems:

| Type of electrical storage | Energy density ($WhKg^{-1}$) | Power density ($WKg^{-1}$) |
| --- | --- | --- |
| Normal capacitor (Existing) | 0.01-0.05 | $10^7$ |
| Electrochemical cell (Existing) | 0.05-5 | $10$-$10^5$ |
| Battery (Existing) | 10-100 | 10-500 |
| Fuel cell (Existing) | 100-1000 | 5-200 |
| Supercapacitor (Existing) | 50-800 | $10^4$-$10^7$ |
| Liquid Supercapacitor* (Present work) | $1.2 \times 10^5$ (170 $Whcc^{-1}$) | $1.4 \times 10^8$ ($2 \times 10^5$ $Wcc^{-1}$) |

*Density of the PZT/DEG containing LCDM = 1.42 gm/cc

In the detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes, but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances. where a convention analogous to "at least one of A, B, and C, etc." is used, in general, such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges, which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A liquid composite dielectric material comprising:
   a metal-containing material comprising a morphotropic phase boundary, wherein the metal-containing material comprises Pb, Zr, and Ti; and
   an organic liquid, wherein the organic liquid is diethylene glycol, and wherein the metal-containing material is dispersed within the organic liquid.

2. The liquid composite dielectric material of claim 1, wherein the metal-containing material is a ferroelectric lead zirconate titanate ceramic.

3. The liquid composite dielectric material of claim 1, wherein the metal-containing material is represented by the formula $PbZr_xTi_{1-x}O_3$, wherein x is in the range of about 0.40 to about 0.60.

4. The liquid composite dielectric material of claim 3, wherein x is in the range of about 0.48 to about 0.54.

5. The liquid composite dielectric material of claim 1, wherein the liquid composite dielectric material comprises an amount of the metal-containing material in the range of about 1% to about 5% by weight.

6. The liquid composite dielectric material of claim 1, wherein the metal-containing material is a powder form.

7. The liquid composite dielectric material of claim 1, wherein the powder form has an average particle size in the range of about 45 nm to about 200 nm.

8. The liquid composite dielectric material of claim 1, wherein the liquid composite dielectric material is a homogeneous solution.

9. The liquid composite dielectric material of claim 1, wherein the liquid composite dielectric material has a dielectric permittivity ($\in_r$) of 10,000 or more at 40 Hz and a dielectric loss (tan δ) of 1 or less at 40 Hz.

10. A method comprising applying a voltage to the liquid dielectric composite of claim 1, wherein the voltage is about 1 V to about 100 V and the voltage has a frequency of about 40 Hz to about 10 MHz.

11. A liquid composite dielectric material comprising:
    a metal-containing material comprising a morphotropic phase boundary, wherein the metal-containing material is represented by the formula $0.65Pb(Mg_{1/3}Nb_{2/3})O_3$-$0.35PbTiO_3$; and
    an organic liquid, wherein the organic liquid is a glycol, and wherein the metal-containing material is dispersed within the organic liquid.

12. The liquid composite dielectric material of claim 11, wherein the liquid composite dielectric material comprises an amount of the metal-containing material in the range of about 1% to about 5% by weight.

13. The liquid composite dielectric material of claim 11, wherein the metal-containing material is a powder form.

14. The liquid composite dielectric material of claim 11, wherein the powder form has an average particle size in the range of about 45 nm to about 200 nm.

15. The liquid composite dielectric material of claim 11, wherein the glycol is diethylene glycol.

16. A method of making a liquid composite dielectric material, the method comprising:
  forming a powder by a sol gel route, wherein the powder comprises a metal-containing material having a morphotropic phase boundary, wherein the metal-containing material comprises Pb, Zr, and Ti; and
  dispersing the powder in an organic liquid, wherein the organic liquid is diethylene glycol.

17. The method of claim 16, wherein the metal-containing material is a ferroelectric lead zirconate titanate ceramic.

18. The method of claim 16, wherein the metal-containing material is represented by the formula $PbZr_xTi_{1-x}O_3$, wherein x is in the range of about 0.40 to about 0.60.

19. The method of claim 16, wherein an amount of the metal-containing material in the range of about 1% to about 5% by weight is dispersed in the organic liquid.

20. A capacitor comprising a first conductor, a second conductor, and a dielectric medium disposed between the first conductor and the second conductor, wherein:
  the capacitor is configured so that applying a voltage potential between the first conductor and the second conductor produces an electric field in the dielectric medium;
  the dielectric medium comprises an organic liquid and a metal-containing material having a morphotropic phase boundary, wherein the organic liquid is diethylene glycol, and wherein the metal-containing material comprises Pb, Zr, and Ti; and
  the metal-containing material is dispersed within the organic liquid.

* * * * *

UNITED STATES PATENT AND TRADEMARK OFFICE
CERTIFICATE OF CORRECTION

PATENT NO.        : 8,431,037 B2                                    Page 1 of 3
APPLICATION NO.   : 12/646435
DATED             : April 30, 2013
INVENTOR(S)       : Mamidanna et al.

It is certified that error appears in the above-identified patent and that said Letters Patent is hereby corrected as shown below:

On the Title Page, Item (30), under "Foreign Application Priority Data", in Column 1, Line 1, delete "Oct. 11, 2009" and insert -- Nov. 10, 2009 --, therefor.

On the Title Page, Item (56), under "FOREIGN PATENT DOCUMENTS", in Column 2, Line 5, delete "WO WO00/26152 A1 5/2000".

On the Title Page, Item (56), under "OTHER PUBLICATIONS", in Column 2, Line 7, delete "CaCu3Ti4O12" and insert -- $CaCu_3Ti_4O_{12}$ --, therefor.

On the Title Page, Item (56), under "OTHER PUBLICATIONS", in Column 2, Line 9, delete "Electropedia," and insert -- Electropaedia, --, therefor.

On Title Page 2, Item (56), under "OTHER PUBLICATIONS", in Column 2, Line 4, delete "CaCu3Ti4O12" and insert -- $CaCu_3Ti_4O_{12}$ --, therefor.

On the Title Page, Item (56), under "OTHER PUBLICATIONS", in Column 2, Line 7, delete "CaCu3Ti4O12" and insert -- $CaCu_3Ti_4O_{12}$ --, therefor.

In the Drawings:

In Fig. 3, Sheet 3 of 3, delete "  " and

Signed and Sealed this
Eighteenth Day of March, 2014

Michelle K. Lee
*Deputy Director of the United States Patent and Trademark Office* insert --  --, as shown on the attached page, therefor.

In the Specification:

In Column 1, Line 54, delete "composite" and insert -- liquid composite --, therefor.

In Column 1, Line 60, delete "LCDC" and insert -- LCDM --, therefor.

In Column 4, Line 4, delete "frequency w." and insert -- frequency $\omega$. --, therefor.

In Column 4, Lines 39-40, delete "piezoelectic" and insert -- piezoelectric --, therefor.

In Column 6, Line 40, delete "LCDC." and insert -- LCDM. --, therefor.

In Column 8, Line 19, under "TABLE 1", delete "supercapactitor" and insert -- supercapacitor --, therefor.

Figure 3